(12) United States Patent
Sammann et al.

(10) Patent No.: US 7,100,360 B2
(45) Date of Patent: Sep. 5, 2006

(54) PULSED COMBUSTION ENGINE

(75) Inventors: Bradley C. Sammann, East Hampton, CT (US); Wendell V. Twelves, Jr., Glastonbury, CT (US); Gary D. Jones, Jensen Beach, FL (US); James W. Norris, Lebanon, CT (US); Harvey L. Klein, East Hampton, CT (US); James E. Jones, Jensen Beach, FL (US); Stephen K. Kramer, Cromwell, CT (US); Douglas A. Thonebe, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 208 days.

(21) Appl. No.: 10/608,238

(22) Filed: Jun. 27, 2003

(65) Prior Publication Data

US 2005/0000205 A1    Jan. 6, 2005

Related U.S. Application Data

(63) Continuation-in-part of application No. 10/334,019, filed on Dec. 30, 2002.

(51) Int. Cl.
*F02K 3/02* (2006.01)

(52) U.S. Cl. ............. 60/226.1; 60/247; 60/39.38; 60/39.39; 60/39.76

(58) Field of Classification Search .......... 60/39.34, 60/39.35, 39.37, 39.38, 39.39, 226.1, 246, 60/247, 248, 39.76, 39.78, 201; 431/1
See application file for complete search history.

(56) References Cited

U.S. PATENT DOCUMENTS

| 2,395,403 | A | * | 2/1946 | Goddard | 60/201 |
|---|---|---|---|---|---|
| 2,442,610 | A | * | 6/1948 | Meister | 423/63 |
| 2,479,829 | A | * | 8/1949 | Goddard | 60/201 |
| 2,543,864 | A | * | 3/1951 | Melenric | 60/266 |
| 2,557,198 | A |  | 6/1951 | Nichols |  |
| 2,579,049 | A | * | 12/1951 | Price | 60/39.35 |
| 2,609,663 | A | * | 9/1952 | Newcomb | 60/798 |
| 2,612,021 | A | * | 9/1952 | Zuhn | 60/39.34 |
| 2,612,750 | A | * | 10/1952 | Goddard | 60/201 |
| 2,630,676 | A | * | 3/1953 | Seifert | 60/39.35 |
| 2,630,677 | A | * | 3/1953 | Seifert | 60/39.35 |
| 2,680,949 | A | * | 6/1954 | Butler | 60/39.34 |
| 2,736,369 | A | * | 2/1956 | Hall | 431/158 |
| 2,748,564 | A |  | 6/1956 | Marchal et al. |  |
| 2,836,958 | A | * | 6/1958 | Ward, III | 60/39.35 |
| 2,888,803 | A |  | 6/1959 | Pon |  |
| 2,930,196 | A |  | 3/1960 | Hertzberg et al. |  |
| 3,321,911 | A | * | 5/1967 | Myles | 60/39.35 |
| 3,362,157 | A | * | 1/1968 | Taylor | 60/39.34 |
| 3,417,564 | A |  | 12/1968 | Call |  |
| 3,469,396 | A | * | 9/1969 | Onishi et al. | 60/39.35 |
| 3,557,551 | A | * | 1/1971 | Campbell | 60/791 |
| 3,791,139 | A | * | 2/1974 | Simons | 60/39.34 |

(Continued)

FOREIGN PATENT DOCUMENTS

DE    690569    4/1940

(Continued)

*Primary Examiner*—William H. Rodriguez
(74) *Attorney, Agent, or Firm*—Bachman & LaPointe, P.C.

(57) ABSTRACT

A pulsed combustion device includes a support structure and a combustor carousel supported by the support structure and rotating relative thereto about an axis. The carousel has a number of combustion conduits in a circumferential array. Each conduit cyclically receives a charge and discharges combustion products of the charge.

27 Claims, 7 Drawing Sheets

U.S. PATENT DOCUMENTS

| | | |
|---|---|---|
| 3,792,584 A | 2/1974 | Klees |
| 3,798,900 A * | 3/1974 | Petersen ..................... 60/786 |
| 4,314,444 A | 2/1982 | Putnam et al. |
| 4,570,438 A | 2/1986 | Lorenz |
| 5,138,831 A * | 8/1992 | Cowan, Sr. ................ 60/39.34 |
| 5,218,816 A | 6/1993 | Plemmons et al. |
| 5,473,885 A | 12/1995 | Hunter, Jr. et al. |
| 5,579,633 A | 12/1996 | Hunter, Jr. et al. |
| 5,899,660 A | 5/1999 | Dodd |
| 5,937,635 A | 8/1999 | Winfree et al. |
| 5,960,625 A * | 10/1999 | Zdvorak, Sr. .............. 60/39.34 |
| 6,442,930 B1 | 9/2002 | Johnson et al. |
| 2002/0139106 A1 | 10/2002 | Meholic |
| 2004/0123582 A1* | 7/2004 | Norris et al. .............. 60/39.38 |

FOREIGN PATENT DOCUMENTS

| | | |
|---|---|---|
| DE | 19850812 | 8/2000 |
| GB | 710252 | 6/1954 |
| GB | 756288 | 9/1956 |

* cited by examiner

PULSED COMBUSTION ENGINE

This is a Continuation-in-Part of Ser. No. 10/334,019, filed Dec. 30, 2002, and entitled "COMBUSTION IGNITION". Ser. No. 10/334,019 is incorporated herein by reference as if set forth at length.

BACKGROUND OF THE INVENTION (1) Field of the Invention

This invention relates to engines, and more particularly to hybrid pulse combustion turbine engines.

(2) Description of the Related Art

In a conventional gas turbine engine, combustion occurs in a continuous, near constant pressure (Rankine cycle), mode. Such conventional gas turbine engine combustion is notoriously inefficient and has led to many efforts to improve efficiency.

It has been proposed to apply the more efficient combustion of near constant volume combustion pulse detonation engines (PDEs) to turbine engine combustors. In a generalized PDE, fuel and oxidizer (e.g., oxygen-containing gas such as air) are admitted to an elongate combustion chamber at an upstream inlet end, typically through an inlet valve as a mixture. Upon introduction of this charge, the valve is closed and an igniter is utilized to detonate the charge (either directly or through a deflagration to detonation transition). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion. U.S. Pat. No. 6,442,930, for example, suggests combustor use of PDE technology in addition to use as a thrust augmentor in engines with conventional combustors.

BRIEF SUMMARY OF THE INVENTION

One aspect of the invention involves a turbine engine having a case, a compressor section, and a turbine section. A circumferential array of combustion chamber conduits is downstream of the compressor and upstream of the turbine. The array is supported for continuous rotation relative to the case in a first direction about the case axis to cyclically bring each conduit from a charging zone for receiving a charge from upstream to a discharge zone for downstream discharging of products of combustion of the charge.

In various implementations, there may be a first airflow substantially through the compressor and turbine and a first portion of the first airflow may pass through the combustion chamber conduits in the charges and a second portion of the first airflow may bypass combustion. A mass flow ratio of the first portion to the second portion may be between 1:1 and 1:3. The engine may be a turbofan and the first airflow may be a core airflow. A bypass airflow may bypass the compressor and turbine. A mass flow ratio of the bypass airflow to the core airflow may be between 3:1 and 9:1. The combustion may comprise detonation. The turbine and compressor may each comprise high and low stages on respective high and low spools. The array may be on a free spool and its rotation may be driven by partially tangential direction of the products of combustion. The conduits may be at least partially tangentially directed. The conduits may be substantially longitudinally directed and the engine may include a number of airfoils mounted on the free spool to partially tangentially direct the products. The engine may include a number of igniters, each of which is positioned relative to an associated one of the conduits to ignite the combustion of the charge in the associated conduit. The engine may include means for starting the rotation.

Another aspect of the invention involves a turbofan engine having a fan, a compressor, and a turbine coaxial with the compressor along an axis. A pulsed combustion combustor receives air from the compressor and outputs combustion gases to the turbine. The combustor has a number of combustion chamber conduits held for rotation about the axis through a number of positions. The positions may include at least one charge receiving position for receiving a charge from upstream, at least one initiation position for initiating combustion of the charge, and at least one discharge position for downstream discharging of products of combustion of the charge.

In various implementations, the engine may include at least one fuel injector for injecting fuel into air from the compressor to form the charges. The engine may include at least one ring of foils rotating with the conduits as a unit.

Another aspect of the invention involves a pulsed combustion device including a support structure and a combustor carousel supported by the support structure and rotating relative thereto about an axis. The carousel includes a number of combustion conduits in a circumferential array, each cyclically receiving a charge and discharging combustion products of the charge.

In various implementations, the carousel may include means for driving the rotation. The means may include a number of foils positioned to redirect the discharge from the combustion conduits. The combustion may include detonation. The device may be a turbine engine having a compressor upstream of the carousel and a turbine downstream of the carousel. The device may include a non-rotating manifold portion having at least one sector conveying air to an aligned transient first group of the combustion conduits and at least a second sector blocking from upstream communication upstream ends of an aligned second group of the combustion conduits. There may be at least ten such conduits. The conduits may have median cross-sectional areas between 12.9 cm$^2$ and 51.6 cm$^2$. The device may be used in aircraft propulsion.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 7 is a transverse sectional view of a core duct of the engine of FIG. 1 taken along line 7—7.

FIG. 9 is a transverse sectional view of the core duct of the engine of FIG. 1 taken along line 9—9.

Like reference numbers and designations in the various drawings indicate like elements.

DETAILED DESCRIPTION

In lieu of conventional Rankine cycle combustion, a number of pulse combustion devices may be located in one or more rings about the engine. The rings are located on a rotating carousel, rotation of which passes each device through a first portion of a rotation during which the device is charged and to a second portion in which it is discharged, with combustion occurring between. In a given 360° of rotation there may be more than one pair of charging and discharging phases. The rotation may be driven by one of the turbine's spools or by tangential diversion of gases discharged by the devices.

Figure 1:
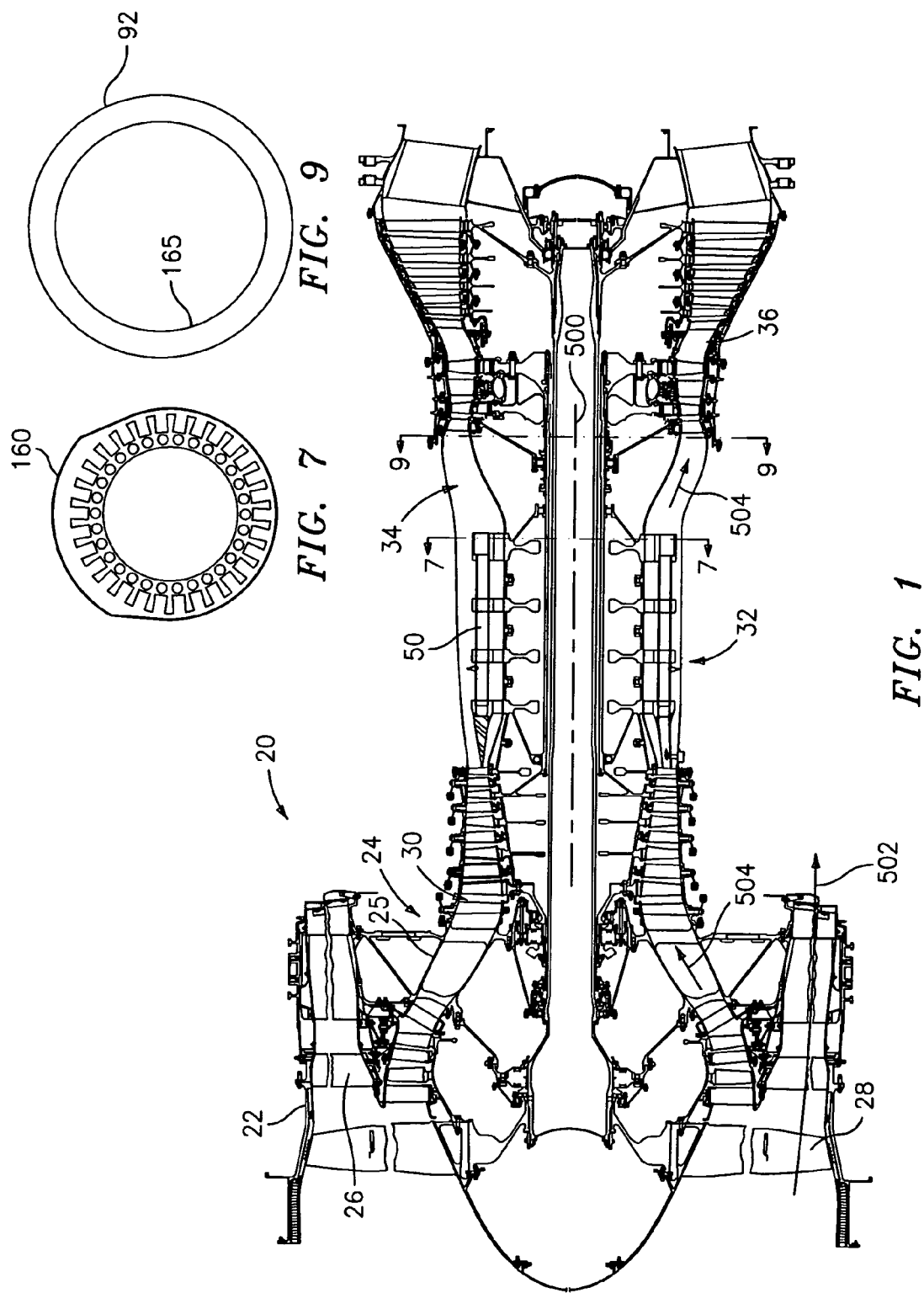
FIG. 1 is a partial longitudinal sectional view of a turbofan engine.

FIG. 1 shows a turbofan engine 20 having central longitudinal axis 500, a duct 22 and a core 24. The duct is supported relative to a case assembly 25 of the core by vanes 26. Of inlet air entering the duct, a fan 28 drives a bypass portion along a first flow path 502 radially between the duct and the core and core portion along a second flowpath 504 through the core. In the core downstream of the fan, a compressor section 30 having alternating rings of rotor blades and stator vanes compresses the core air and delivers it further downstream to a combustor section 32 where it is mixed with fuel and combusted. A combustor bypass portion of the core air may bypass the combustor and be mixed in a mixing duct 34 downstream of the combustor with the portion flowing through the combustor. Downstream of the mixing duct, a turbine section 36 is driven by the mixing duct output to, in turn, drive the compressor and fan. An augmentor (not shown) may be located downstream of the turbine.

Figure 2:
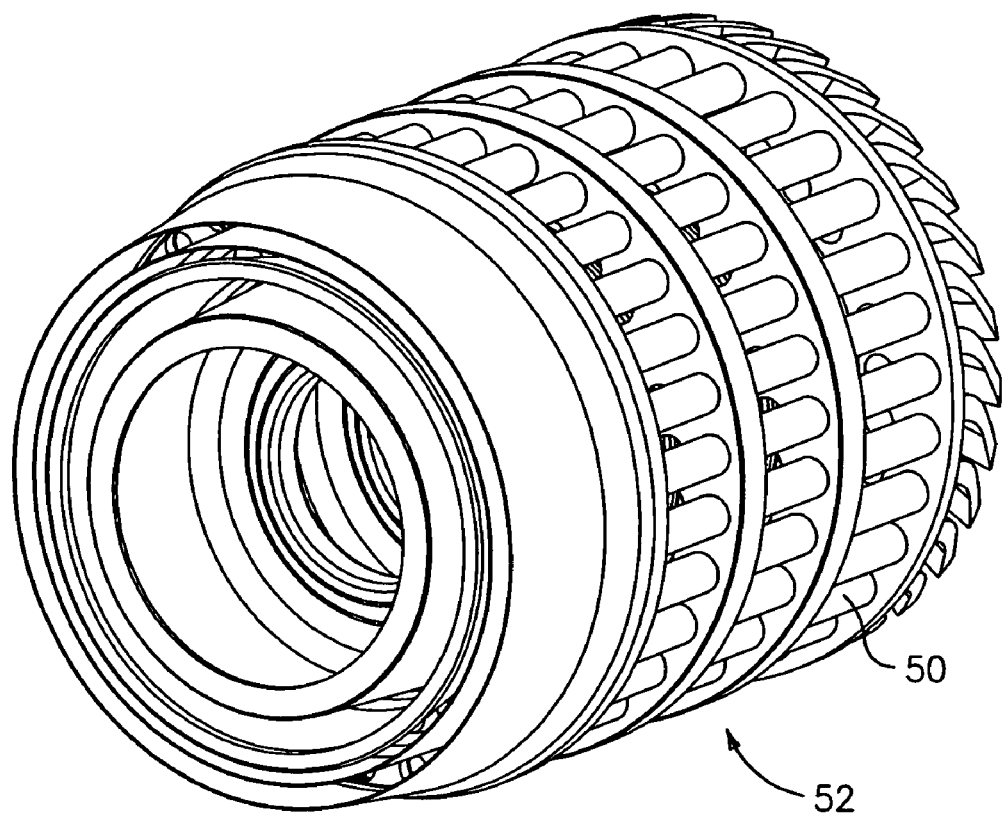
FIG. 2 is an isolated isometric view of a combustor of the engine of FIG. 1.
Figure 3:
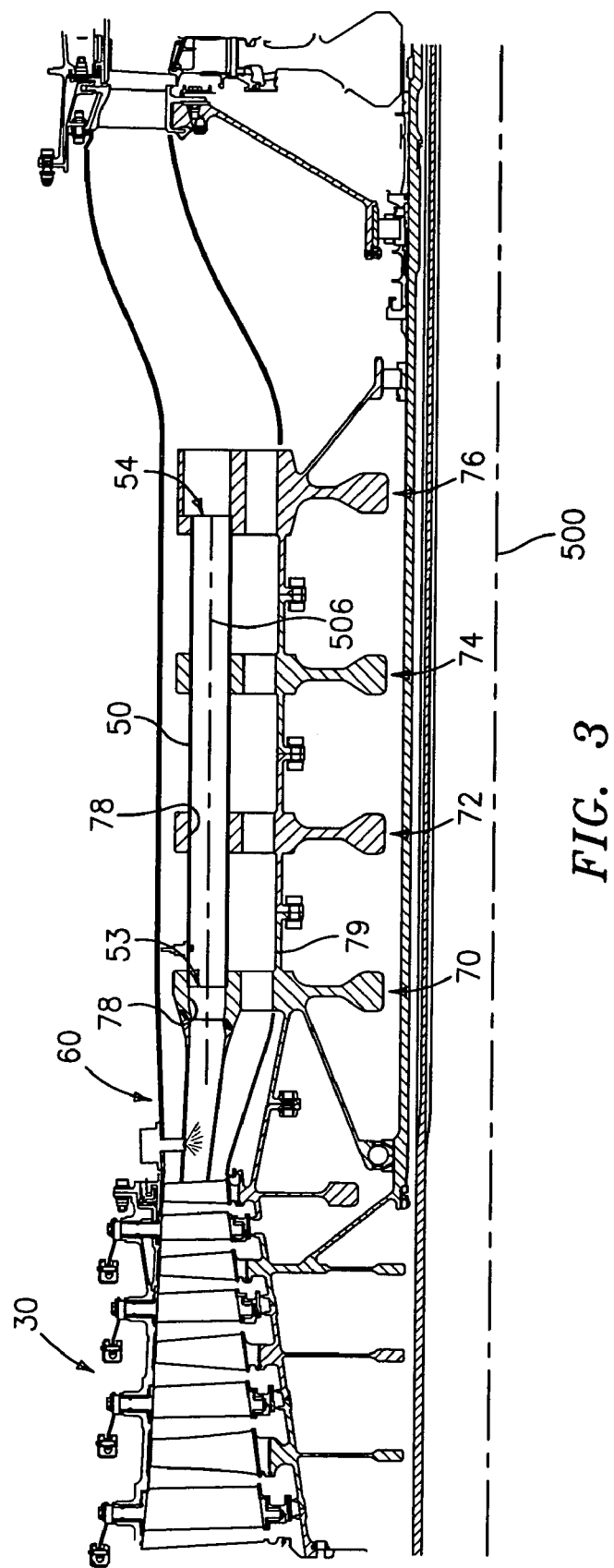
FIG. 3 is a partial longitudinal sectional view of the engine of FIG. 1 along a charging sector.
Figure 4:
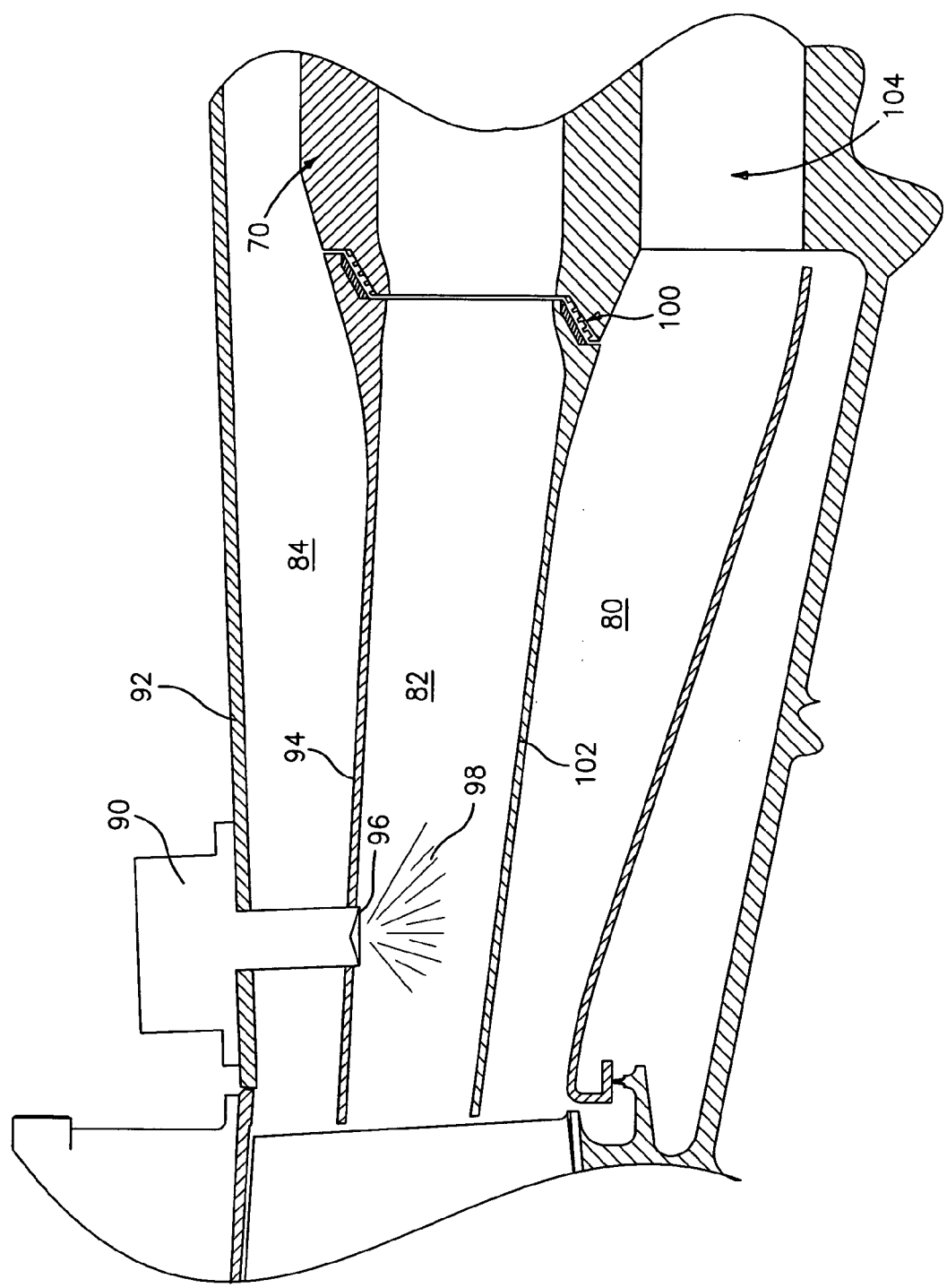
FIG. 4 is a longitudinal sectional view of a manifold of the engine of FIG. 1 along the charging sector.

The exemplary combustor includes a ring of combustion tubes 50 which may be operated as pulse combustion tubes. Exemplary tubes are operated as pulse detonation tubes, although a similar structure may potentially be used with pulse deflagration tubes. The tubes are mounted in a carousel structure 52 (FIG. 2) for rotation relative to the case assembly about the engine central longitudinal axis. Each exemplary tube 50 (FIG. 3) has a forward upstream inlet end 53 and an aft downstream outlet end 54 along a central longitudinal axis 506. The tube inlet ends are proximate an aft, downstream portion of a fixed manifold 60. The exemplary carousel includes a number of disks 70, 72, 74, and 76 from fore to aft. In the illustrated embodiment and as discussed further below, the carousel forms a third free spool in addition to the high and low spools of the turbine/compressor combination. Proximate their outboard peripheries, the disks have apertures 78 into which the tubes 50 are secured. Disk platforms 79 combine to form a cylindrical inboard wall of the local core flow path. In the exemplary embodiment, along a charging sector of the manifold, the manifold 60 splits the core flow into three portions in inboard, intermediate, and outboard manifold sections 80, 82 and 84 (FIG. 4). Along this charging sector, the manifold has a circumferential array of fuel injectors 90 mounted in an outer wall 92 of the core and penetrating the outer section 84 to a wall 94 separating the sections 82 and 84. An injector outlet 96 is positioned to introduce fuel 98 into the intermediate section 82 where it mixes with that portion of the core air passing through the intermediate section. Along the charging sector, the manifold intermediate section 82 is in communication with a transiently aligned group of the tubes 50. A sealing system 100 is provided on a downstream end of the wall 94 and a downstream end of a wall 102 separating the sections 80 and 88. The sealing system cooperates with the leading disk 70 to pass the fuel air mixture from the manifold section 82 into the tubes 50 when the tubes are aligned with the charging sector. In the illustrated embodiment, the inboard manifold section 80 passes an inboard portion of the core air to the carousel where it may pass through inboard apertures 104 in the disks to bypass the tubes 50. Similarly, the manifold outboard section 84 passes an outboard portion of the core air around the outer peripheries of the disks to bypass the tubes. Once in the carousel, there may be mixing of these two bypass portions between the disks.

Figure 5:
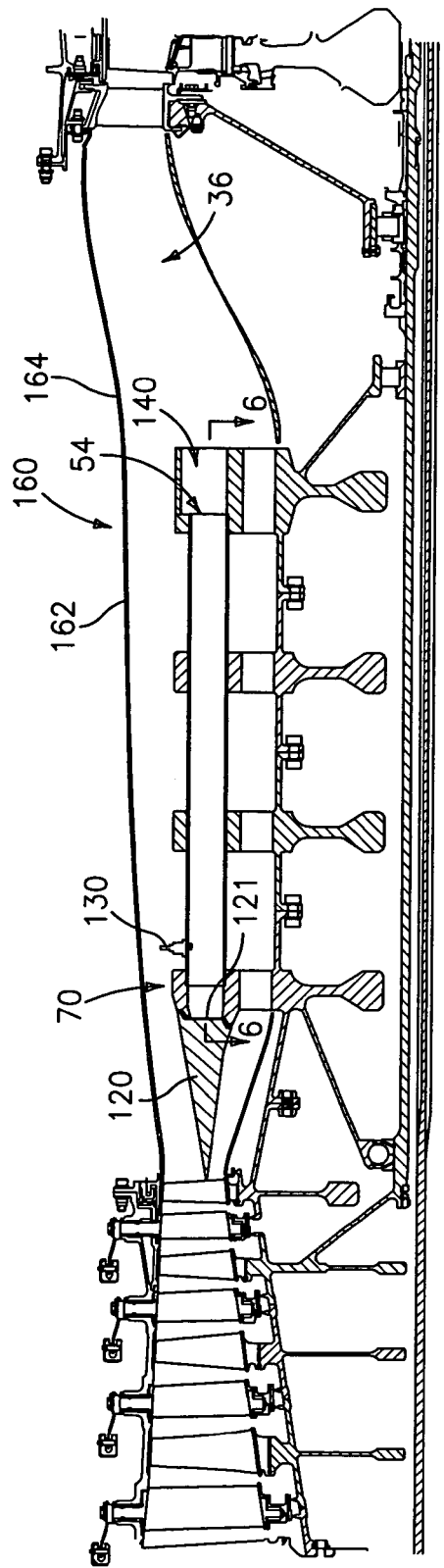
FIG. 5 is a partial longitudinal sectional view of the engine of FIG. 1 along a discharging sector.

Outside of the charging sector, the manifold has a blocking element 120 (FIG. 5) which cooperates with the leading disk 70 to seal the inlet end of the tube 150 to create a combustion chamber. The exemplary blocking element 120 may be formed by a merging and thickening of the walls 94 and 102. The exemplary combustion chamber is bounded by a vessel created by the tube 50, a small portion of the disk 70 thereahead and an aft blocking surface portion 121 of the element 120. Ignition and discharge may occur when each tube is so sealed. Along this ignition/discharging sector, the exemplary manifold separates the core air flow into inboard and outboard flows bypassing the tubes in similar fashion to the bypassing flows of the charging sector. The engine includes means for initiating the combustion of the fuel/air charge in the combustion chambers. Exemplary means initiate this as soon as the combustion chamber is closed off at the beginning of the ignition/discharging sector. FIG. 5 shows means in the form of a single spark plug 130 for each tube 50. When a single such plug is used, it is advantageously located proximate the upstream end of the combustion chamber. In the exemplary embodiment, the plug is mounted in the sidewall of the tube 50 just downstream of the disk 70. This exemplary spark plug rotates with the tube and is powered/controlled by an appropriate distributor mechanism or the like providing electrical communication between rotating and non-rotating portions of the engine. An alternative embodiment would mount the plug 130 in the blocking member 120 with its operative end in an opening in the surface 121. Such a mounting may reduce complexity of electrical communication between rotating and non-rotating parts of the engine. Yet alternate initiation systems include multi-point, continuous (e.g., laser or other energy beam), or multi-continuous systems. Examples of such systems are found in Ser. No. 10/334,019. The combustion chamber has an overall length L and a characteristic transverse dimension identified as a diameter D. When triggered, the igniter produces a detonation pulse which propagates a flame front radially outward from an associated ignition point at the plug at a supersonic speed (e.g., over about 3,000 feet per second (fps) and typically in the range of 4,000–6,000 fps). Near total combustion will be achieved in the time required for the flame front to travel from the plug to the outlet 54. With the plug proximate the upstream end of the chamber and D substantially smaller than L, this travel distance is essentially equal to L. An exemplary operating pressure ratio (OPR) for such detonation combustion is between 2:1 and 6:1.

Figure 6:
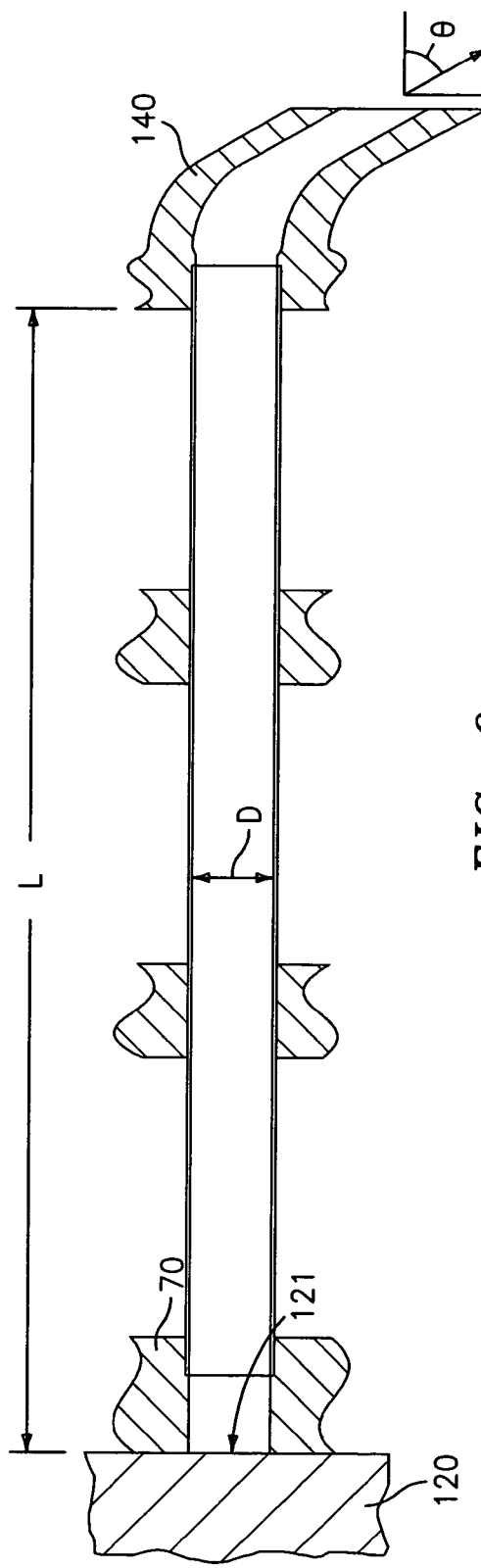
FIG. 6 is a sectional view of a combustion tube of the engine of FIG. 5 taken along line 6—6.

Combustion gases discharged from the tube outlets 54 encounter turning vanes 140 which may be unitarily formed with the aft carousel disk 76. In the exemplary embodiment, an equal number of turning vanes 140 are alternatingly interspersed with the tubes 50. Adjacent vanes divert the discharge from the tubes by an angle θ (FIG. 6) relative to the tube axis 506 and local longitudinal centerplane of the engine. In the exemplary embodiment, this diversion applies sufficient torque to the carousel to rotate the carousel at a desired rotational speed. In an exemplary three-spool engine, an exemplary steady state rotational speed of the carousel is 2,000–18,000 RPM. The specific operating range will be influenced by engine dimensional considerations in view of carousel structural integrity and the number of charge/discharge cycles per rotation. A narrower range of 6,000–12,000 target RPM is likely with the lower third of this range more likely for a two cycle/rotation engine and the upper third for a one cycle/rotation engine. In operation, these speeds will likely be substantially lower than the high spool speed and approximately the same or moderately lower than the low spool speed. An initial rotation may be provided by the engine starter motor or by a dedicated starter motor for the combustor.

The discharge flow is mixed with the combustor bypass flows before encountering the turbine. In the exemplary embodiment, an outboard portion of the flow passing over the trailing disk 76 may at least partially mix with a discharge flow along the vanes 140. An inboard portion passing through the apertures 104 in the trailing disk may mix further downstream in the mixing duct 34.

Figure 8:
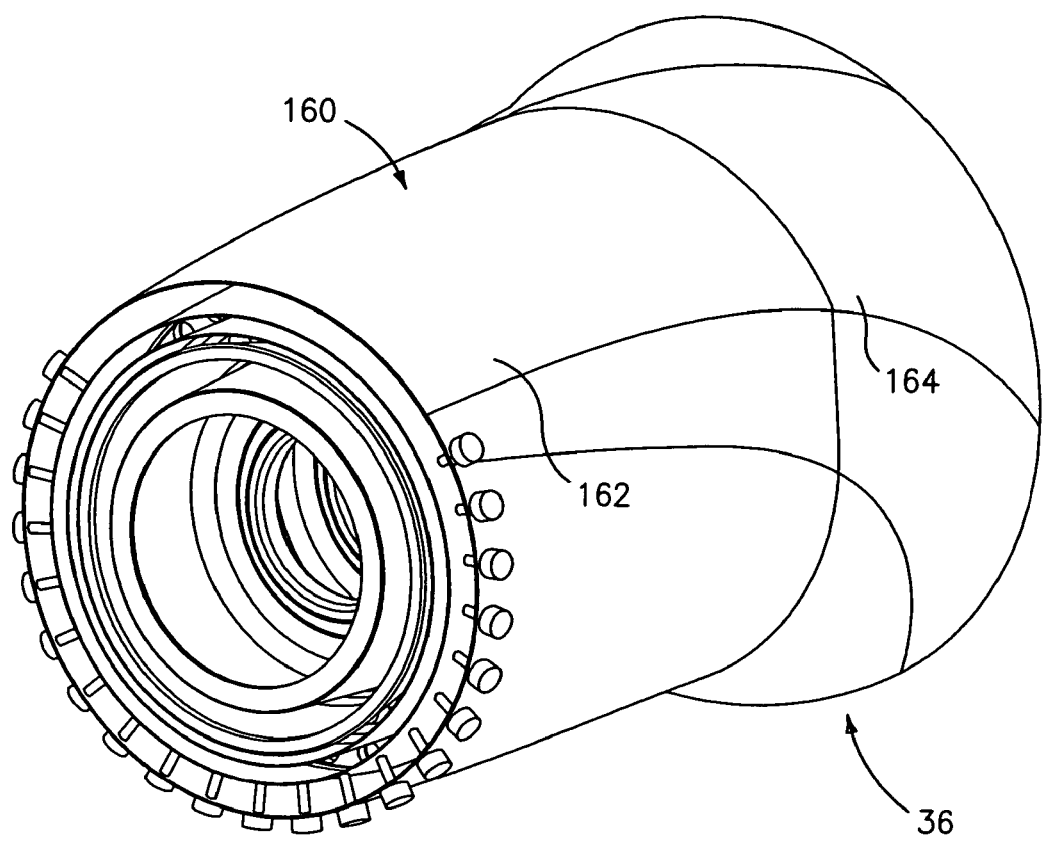
FIG. 8 is an isolated isometric view of the duct of FIG. 7.

The features of the mixing duct may advantageously be synergistically designed relative to features of the core outer wall 92 along the combustor. The core outer wall 92 has a locally radially elevated section or hump 160 (FIGS. 5 and 7) with a first portion 62 extending aft from near a forward end of the carousel and a second portion 164 extending further rearward along a forward portion of the mixing duct 34 (FIGS. 5 and 8). Portions of the outer wall fore and aft (e.g., FIG. 9) of the hump are of more even radial position about the circumference of the core. The hump is associated with the discharging sector. The hump is shaped to drive a large percentage of the core bypass flow volume to the vicinity of the firing combustor tubes. The hump provides a non-uniform cross section for increased cross sectional flow area in the firing discharge zone of a mixing plane. The large volume of relatively cool core air that bypasses the combustor tube mixes with and reduces the temperature of the exhaust effluents. Along the portion 164, the cross-section of the mixing duct transitions to an annular cross-section prior to reaching the turbine face. The exemplary core inboard wall 165 (FIG. 9) is annular along substantially the entire length of the mixing duct and forms a smooth transition from the portion provided by the disk platforms 79 thereahead. The transition geometry forces mixing of core bypass and exhaust gas to provide a uniform distribution of the mixed gases around the circumference of the mixing duct at the turbine face.

The hump and mixing duct geometry and the volume between the turning vanes and the turbine face serve three primary functions: 1) to diffuse the high velocity exhaust gases from the combustor tubes to a useable pressure rise compatible with the engine through flow requirements; 2) to mix out and transition localized hot, exhaust effluents and cool core by-pass air to a uniform (or nearly uniform) temperature flow of gas at the turbine face; and 3) act as a pressure pulse dampener to smooth out the flow presented to the turbine. An exemplary hump may be disposed helically in accordance with the helical velocity component of exhaust gases exiting the combustor (e.g., as in FIG. 8).

In exemplary embodiments, there may be between four and sixty combustion tubes, more narrowly, twenty and forty. Exemplary tube lengths(and the approximately similar combustion chamber lengths) are between six inches (15 cm) and forty inches (102 cm), more narrowly, twelve inches (30 cm) and thirty inches (76 cm). The exemplary tube cross sectional areas are between 1.0 inch$^2$ (6.5 cm$^2$) and twenty inch$^2$ (129 cm$^2$), more narrowly, 2.0 inch$^2$ (12.9 cm$^2$) and eight inch$^2$ (51.6 cm$^2$). An exemplary discharging sector is between 5° and 120°, more narrowly, 10° and 100°. However, the key limitation regarding the charging sector is the time required to charge the combustion tubes at a given radius from the engine centerline and rotational speed. This gives rise to the possibility of multiple charge/discharge cycles during one 360° rotation of the carousel. In such a situation there could be multiple charging and discharging sectors, humps, and the like.

The magnitude of the pressure pulses from the individual combustion tubes is minimized by the apparent high firing frequency (e.g., 1000 Hz to 6000 Hz) provided by the rotating tube pack. The pressure pulses may overlap at a relatively uniform peak level resulting in a quasi-steady state effluent pressure. Additional viscous dampening of any residual small cyclical pressure variations occurs in the volume of the duct as the core bypass and combustor tube exhaust gases mix together. The mixed gases are then expanded through the turbine.

If sealing the inlet ends of the conduit is impractical in view of cost and durability considerations, alternative embodiments involve providing the blocking portion with a u-shaped passageway, one leg of which communicates with the tube inlet and the other leg of which communicates with an auxiliary at least partially longitudinal exhaust conduit. Such exhaust conduit may be mounted to the carousel or fixed and external thereto. Upon ignition of the charge in the combustion conduit, the combustion products are expelled both from the combustion tube outlet and from the inlet. The latter flow of combustion products may flow through the exhaust conduit and, for example, join the remainder at an outlet of such exhaust conduit proximate the combustion tube outlet. This reduces the pressure loads on the seal between the manifold and carousel.

Figure 10:
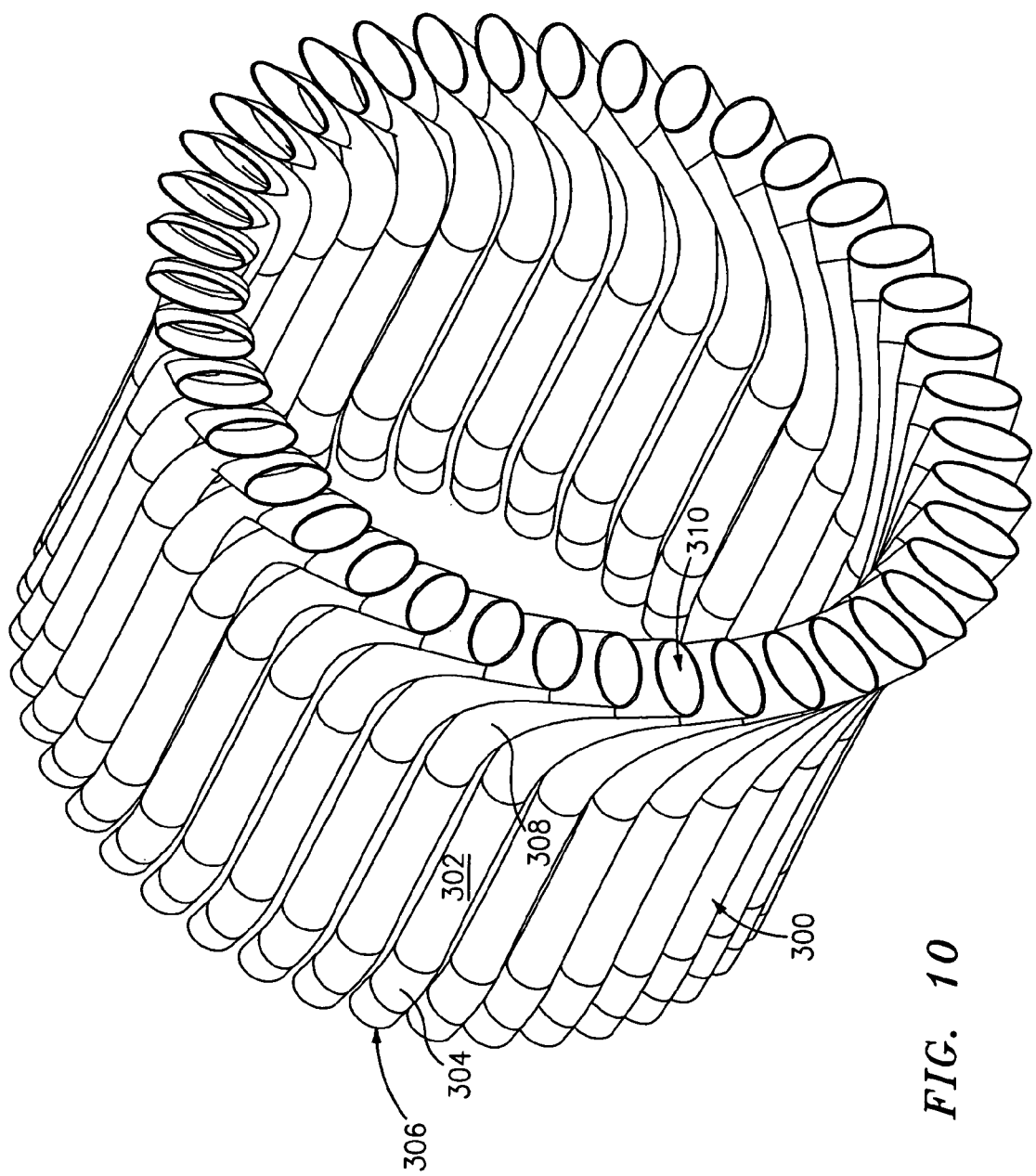
FIG. 10 is an isolated isometric view of an alternate combustor tube array.

Many variations are possible. For example, the tubes may be other than parallel to the engine central axis. This, for example, includes skewing at substantially even radius from the engine axis or at a radius that varies with the longitudinal position. The tubes may be other than straight. For example, FIG. 10 shows an array of tubes 300 each having a straight central section 302 which may be parallel to the engine axis. Each tube has a curved leading portion 304 extending between a tube inlet 306 and the section 302. The section 304 may be curved skew to the engine axis. Similarly, each tube has a curved trailing section 308 between the section 302 and an outlet 310. The exemplary section 308 may be skewed and directed radially outward to best direct exhaust gas toward the turbine face in view of the relative sizes of the combustor array and turbine face. Other variations may involve tubes with non-circular and non-constant cross-sections. Whereas the circular section provides certain structural and manufacturing advantages, other sections may well be used to provide desired flow properties.

One or more embodiments of the present invention have been described. Nevertheless, it will be understood that various modifications may be made without departing from the spirit and scope of the invention. For example, the details of any particular application will influence the configuration of the combustor. Various features of the combustor may be fully or partially integrated with features of the turbine or the compressor. If applied in a redesign of an existing turbine engine, details of the existing engine may implement details of the implementation. The rotating combustor may alternatively be used in applications beyond turbine engines. Accordingly, other embodiments are within the scope of the following claims.

What is claimed is:

1. A turbine engine comprising:
a case having an axis;
a compressor;
a turbine; and
a circumferential array of combustion chamber conduits, the conduits being downstream of the compressor and upstream of the turbine, the array being supported for continuous rotation relative to the case in a first direction about the axis to cyclically bring each conduit from a charging zone for receiving a charge from upstream to a discharging zone for downstream discharging of products of combustion of said charge, said rotation being driven by partially tangential direction of the products of combustion.

2. The engine of claim 1 wherein there is a first airflow substantially through said compressor and turbine and wherein a first portion of the first airflow passes the combustion chamber conduits in the charges and a second portion of the first airflow bypasses combustion and a mass flow ratio of the first portion to the second portion is between 1:1 and 1:3.

3. The engine of claim 2 wherein the engine is a turbofan and the first airflow is a core airflow and a bypass airflow bypasses the compressor and turbine and a mass flow ratio of the bypass airflow to the core airflow is between 3:1 and 9:1.

4. The engine of claim 1 wherein said combustion comprises detonation.

5. The engine of claim 1 wherein the array is on a free spool.

6. The engine of claim 5 wherein the conduits are at least partially tangentially directed.

7. The engine of claim 5 wherein the conduits are substantially longitudinally directed and the engine comprises a plurality of airfoils mounted on the free spool to partially tangentially direct the products of combustion.

8. The engine of claim 1 wherein said turbine and compressor each comprise high and low stages on respective high and low spools and the array is on a free spool.

9. The engine of claim 1 further comprising a plurality of igniters, each of which is positioned relative to an associated one of the conduits to ignite the combustion of the charge in said associated conduit.

10. The engine of claim 1 further comprising means for starting the rotation.

11. A turbofan engine comprising:
a fan;
a compressor;
a turbine coaxial with the compressor along an axis;
a pulsed combustion combustor receiving air from the compressor and outputting combustion gasses to the turbine and having:
a plurality of combustion chamber conduits held for rotation about the axis through a plurality of positions, including:
at least one charge receiving position for receiving a charge from upstream;
at least one initiation position for initiating combustion of the charge; and
at least one discharge position for downstream discharging of products of combustion of said charge.

12. The engine of claim 11 further comprising at least one fuel injector for injecting fuel into air from the compressor to form the charges.

13. The engine of claim 11 further comprising at least one ring of foils rotating with the conduits as a unit.

14. A pulsed combustion device comprising:
a support structure; and
a combustor carousel supported by the support structure and rotating relative thereto about an axis and comprising:
a plurality of combustion conduits in a circumferential array, each cyclically receiving a charge and discharging combustion products of the charge; and
means for driving said rotation of the carousel by at least partially tangential direction of the combustion products.

15. The device of claim 14 wherein the means comprises a plurality of foils for driving said rotation of the carousel.

16. The device of claim 15 wherein the foils are positioned to redirect the discharge from the combustion conduits.

17. The device of claim 14 wherein combustion of the charge comprises detonation.

18. The device of claim 14 being a turbine engine comprising:
a compressor upstream of the carousel; and
a turbine downstream of the carousel.

19. The device of claim 14 further comprising a nonrotating manifold portion having:
at least a first sector conveying air to an aligned transient first group of the combustion conduits; and
at least a second sector blocking upstream ends of an aligned transient second group of the combustion conduits from upstream communication.

20. The device of claim 14 wherein there are at least ten such combustion conduits.

21. The device of claim 14 wherein the combustion conduits have median cross-sectional areas between 12.9 $cm^2$ and 51.6 $cm^2$.

22. The device of claim 14 used in aircraft propulsion.

23. A turbine engine comprising:
a case having an axis;
a compressor;
a turbine; and
a circumferential array of combustion chamber conduits, the conduits being downstream of the compressor and upstream of the turbine, the array being supported on a free spool for continuous rotation relative to the case in a first direction about the axis to cyclically bring each conduit from a charging zone for receiving a charge from upstream to a discharging zone for downstream discharging of products of combustion of said charge.

24. A turbine engine comprising:
a case having an axis;
a compressor;
a turbine;
a circumferential array of combustion chamber conduits, the conduits being downstream of the compressor and upstream of the turbine, the array being supported for continuous rotation relative to the case in a first direction about the axis to cyclically bring each conduit from a charging zone for receiving a charge from upstream to a discharging zone for downstream discharging of products of combustion of said charge; delete period means for starting the rotation; and means for maintaining the rotation including at least one of:
- a spool driven by said turbine; and
- direction of said products of combustion.

25. A pulsed combustion device comprising:

a support structure;

a combustor carousel supported by the support structure and rotating relative thereto about an axis and comprising: a plurality of combustion conduits in a circumferential array, each cyclically receiving a charge and discharging combustion products of the charge; and a nonrotating manifold portion having:
- at least a first sector conveying air to an aligned transient first group of the combustion conduits; and
- at least a second sector blocking upstream ends of an aligned transient second group of the combustion conduits from upstream communication.

26. A turbofan engine comprising:

a case having an axis;

a compressor;

a turbine; and a circumferential array of combustion chamber conduits, the conduits being downstream of the compressor and upstream of the turbine, the array being supported for continuous rotation relative to the case in a first direction about the axis to cyclically bring each conduit from a charging zone for receiving a charge from upstream to a discharging zone for downstream discharging of products of combustion of said charge, wherein:

there is a core airflow substantially through said compressor and turbine and wherein a first portion of the core airflow passes the combustion chamber conduits in the charges and a second portion of the core airflow bypasses combustion; and a bypass airflow bypasses the compressor and turbine and a mass flow ratio of the bypass airflow to the core airflow is between 3:1 and 9:1.

27. A pulsed combustion device comprising:

a support structure;

a combustor carousel supported by the support structure and rotating relative thereto about an axis and comprising:
- a plurality of combustion conduits in a circumferential array, each cyclically receiving a charge and discharging combustion products of the charge, the combustion conduits having median cross-sectional areas between 12.9 $cm^2$ and 51.6 $cm^2$; and means for maintaining the rotating of the combustor carousel by directing said combustion products.

* * * * *

UNITED STATES PATENT AND TRADEMARK OFFICE
CERTIFICATE OF CORRECTION

| | | |
|---|---|---|
| PATENT NO. | : 7,100,360 B2 | Page 1 of 1 |
| APPLICATION NO. | : 10/608238 | |
| DATED | : September 5, 2006 | |
| INVENTOR(S) | : Bradley C. Sammann et al. | |

It is certified that error appears in the above-identified patent and that said Letters Patent is hereby corrected as shown below:

In column 8, claim 24, line 67, "delete period" should be deleted.

Signed and Sealed this

First Day of May, 2007

JON W. DUDAS
*Director of the United States Patent and Trademark Office*